April 22, 1941.   J. M. MARATECK   2,238,942
LOCK FOR LOCK CONTROLLED ALARMS
Filed Dec. 31, 1937   2 Sheets-Sheet 1
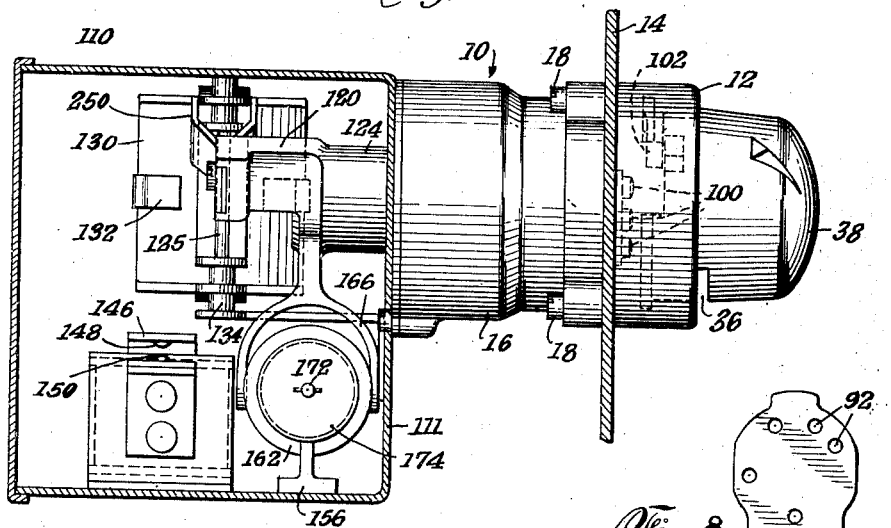
INVENTOR
JACOB M. MARATECK
BY
ATTORNEY April 22, 1941. J. M. MARATECK 2,238,942
LOCK FOR LOCK CONTROLLED ALARMS
Filed Dec. 31, 1937 2 Sheets-Sheet 2
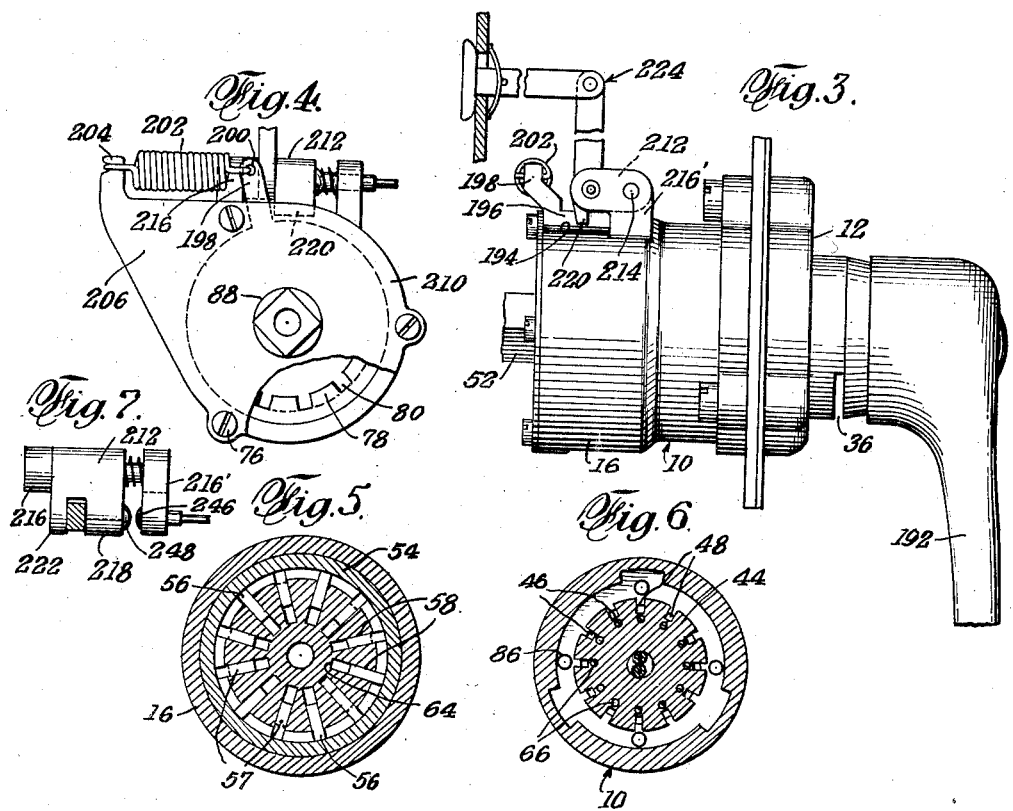
INVENTOR
JACOB M. MARATECK
BY
ATTORNEY Patented Apr. 22, 1941

2,238,942

UNITED STATES PATENT OFFICE 2,238,942

LOCK FOR LOCK CONTROLLED ALARMS

Jacob M. Marateck, New York, N. Y.

Application December 31, 1937, Serial No. 182,892

16 Claims. (Cl. 70—363)

The present invention relates to locks and to alarm circuits controlled by such locks, and contemplates the provision of a new and improved type of lock wherein the interlocking means for the several parts are not directly contacted by the key for engagement or disengagement.

The present invention further contemplates the provision of locks of the character described which are adapted for connection into an alarm circuit and are further adapted to have the alarms set off whenever the operation of the lock with an improper key is attempted.

It is also contemplated by the present invention to provide locks which because of the above described advantages are greatly superior to the locks heretofore used in providing adequate protection against theft and against breaking of the lock by burglars, and which possess many other advantages and superiorities which will become apparent to those skilled from the several practical embodiments of the locks of the present invention which are illustrated in the accompanying drawings in which Fig. 1 is a top plan view of one embodiment of the present invention as particularly adapted for use with the ignition switch of an automobile and of an alarm circuit controlled thereby;

Fig. 2 is a vertical sectional view of the same;

Fig. 3 is a side elevational view of another embodiment of a lock of the present invention as modified for use upon an automobile door;

Fig. 4 is an end view of the lock of Fig. 3, showing the means for connecting the same into an alarm circuit;

Fig. 5 is a cross sectional view of the same taken along line 5—5 of Fig. 2;

Fig. 6 is a similar view taken along line 6—6 of Fig. 2;

Fig. 7 is a detailed top plan view of the means for limiting the movement of the collar within the cylinder of the lock of Fig. 3; and Fig. 8 is a plan view of a key such as may be used for operating the locks of the present invention.

Referring to the lock of the present invention, shown in Figs. 1 and 2, it may be provided with a substantially cylindrical casing 10, consisting, preferably, of a front section 12, which may protrude exteriorly of a door or panel 14, such as the instrument panel of an automobile, as illustrated, and a rear casing section 16, which may be secured to the front section in any suitable manner, such as by the screws 18, to form a complete housing for the lock mechanism.

The rear casing section 16 may have a varying cross-section, being narrowest at its forward end, forming compartment 20, and widest at its rearmost end forming compartment 22, the intermediate portion 24 being set off from the front compartment 20 by shoulder 26 and from the rear compartment 24 by the shoulder 28.

Journalled in compartment 20 is a cylinder 30, one of its ends extending into the front casing section 12, and outwardly therefrom by means of opening 32, the outer end of the cylinder 30 being preferably closed, as at 34, to prevent any access to the interior thereof, and may also be provided with a transverse key slot 36, which passes also through a knob or handle 38, which is engageably mounted on the cylinder 30. The inner end of the cylinder 30 projects into the compartment 24, the projecting part being provided with a flange or lugs 40, which are adapted to abut against shoulder 26, to prevent removal of the cylinder from the casing by way of opening 32.

It will be apparent that the cylinder may be operated by the handle or knob 38, to be rotated or to be pushed inwardly into the casing. I now provide lock bolt operating means which will operatively engage the cylinder 30 to rotate with it to move a lock bolt, not thought necessary to be shown, or other such means in a manner which will be readily understood. Such means may comprise a plug 42, having preferably a cylindrical end portion 44 fitting within the cylinder 30 and rotatably engaging the same, in any desirable manner, such as by means of grooves or channels 46, which mesh with the longitudinal projecting ribs 48, formed on the interior of the cylinder 30.

The plug 42 may have a thicker intermediate cylindrical portion 49 corresponding to and fitting within the compartment 22 of the casing, and may have its other end set off by a shoulder 50 to terminate in a relatively thin shaft 52, which may preferably be squared, and adapted to engage operably any movable member having a squared opening, such as is normally provided in sliding lock bolt mechanism.

I now provide locking means whereby the plug 42, which is rotatably engaged by the cylinder 30, may be locked against rotation. Such locking means may comprise a collar 54 fitting over the plug section 49 within the casing compartment 22 rigid with casing 16, terminating flush with the casing and with the plug shoulder 50.

In the embodiment of the present invention adapted for use as an ordinary lock, without any alarm connections, the collar 54 may be entirely eliminated and its function performed by the casing itself, or it may be fixed within the casing against rotation in any desirable manner not thought necessary to be illustrated. Where the lock is modified for use in an alarm system adapted to function when the wrong key is attempted to be used, the collar may be made to be movable within the casing to an extent and in the manner which will hereinafter be made clear.

The collar 54 is engageable by the plug 42, by means, preferably, of two varieties or sizes of sliding blocks, 56 and 57, respectively, which are guided upon the plug portion 49 within grooves or channels 58 longitudinally formed thereon, somewhat deeper than the channels 46 and preferably continuous with them, and is equal in number to them, such number being shown in the illustration as twelve but which may be readily varied.

The number of each of the varieties of blocks may also be varied, as well as their arrangement. One set or variety, 56 may be double the length of the second set 57, such differences in length being provided in accordance with the principle hereinafter made clear. Each tumbler of either set, in addition to the shank, is provided with a depending lug 67, extending into a well 64 of the channel 58, by means of which it is mounted on a carrier rod 66, which cooperates within longitudinal passages 68, provided in the plug 42, and extends into the cylinder 30 to terminate adjacent the key opening 36, all of the carrier rods being of equal length and terminating in substantially the same plane.

A coil spring 70 is positioned in each well 64, one end abutting against the lug 67 to keep it normally in fixed position against the innermost end of the channel, 58, the other end fitting over a pin 72 projecting from a locking plate 74 which may be secured against the edge of the casing 10, to lock all the parts in place, by means of set screws 76.

The collar 54 is provided with two annular series of teeth 78 forming intermediate grooves 80 cooperating and corresponding in number and relative position to the channels 58 in the plug. These annular series of teeth are provided one at each edge of the collar, and may be of equal width, each occupying substantially one third of the length of the collar, the free and unobstructed space 82 in the center of the collar being of the same length as the teeth.

Each block of both varieties is provided with a wing portion 84, equal in length to the teeth 78, and of a sufficient width to fit within the groove 80 formed between any two teeth. And it may here be stated that the length of the shank of the short block 57 may be equal in length to its wing and of the longer block 56 to twice the length of its wing.

The manner of the assembly and operation of the lock will now be apparent. The cylinder 30 is inserted into the casing 10, and coil springs 85 inserted into recesses 86 provided for the purpose, their projecting ends abutting against the edge of the collar. A number of blocks, as desired, and of a combination of the two varieties as desired, is then mounted within the channels, their carrier rods 66 being inserted into the passages 68. The collar 54 is then fitted over the plug, with its teeth projecting toward the blocks 56 and 57. Springs 70 are then inserted into the well recesses 64, and the assembly, thus completed is closed by the retainer plate 74, the squared shaft 52 projecting from the retainer plate through a suitable opening 88 provided for the purpose.

It will be obvious that because of the pressure of the springs 85 the cylinder 30 will be retained in forward position against the shoulder 26 and that because of the pressure of the springs 70 all of the blocks will be normally held in the forward portion of the channels 58, and that because of the equality of length of all of the carrier rods, they will all terminate in substantially one plane, adjacent the plane of the key slot 36. It will also be obvious that because of the relative proportion of the length of the shanks of the two varieties of blocks, the wing of the shorter variety 57 will be fitted normally within the grooves 80 between the teeth 78 of the forward annular series, which will serve to lock the plug 42 to the collar 54 against rotation therein. It will also be obvious that the wings of the second variety of blocks 56 will extend into the space 82 in the center of the collar and, therefore, be capable of unobstructed movement. It is also apparent that if the blocks 57 could be manipulated to be pushed forward into the collar until their wings 84 also extend into the free central space 82 of the collar, the plug would be entirely disengaged from the collar and would be free to rotate therein, provided such movement of the blocks 57 may be selectively done, without disturbing the set of blocks 56. It is also apparent that if such selective movement is not accomplished, and the blocks 56 are also moved, they will engage the second outer set of teeth 76.

I provide such selective means for moving the blocks 57 without moving the blocks 56 in the form of a flat key 90, adapted to fit within the key slot, which key is provided with a plurality of apertures 92 corresponding in position and number to the position and number of the terminals of the rods carrying blocks 56. It will be apparent that when the key 90 is inserted into the key slot 36 and the handle or knob 38 is pushed inwardly, the cylinder 30 will be pressed inwardly against the springs 85 until it is stopped by the collar 54, such distance being arranged to equal the length of one of the teeth 76. Such forward movement of the cylinder will move the key 90 against the ends of the carrier rods 66. These rods of the blocks 56 will pass through the apertures 92 which are provided to correspond in position with them and will press against the ends of the carrier rods of the blocks 57 and advance them a distance equal to the length of a tooth 76 to disengage them from the collar, permitting the turning of the plug 42 by the handle 38, thus operating the part 124.

Obviously, the improper key will either move both varieties of blocks or will fail to move all of the shorter blocks, 57, in both of which events the plug will not be freed for movement.

The lock of the present invention may be modified to make it more suitable for use in connection with the handle of a door which must constantly and frequently be opened and closed, such as an automobile door, as is illustrated in Figures 3 and 4 of the drawings. Such modification may consist in the provision of means for making the plug 42 rotatable, by the turning of the handle 192 without the use of any key, when so desired. This may be made possible by providing the lock with a collar, as described above, and making such collar 54 movable, to a limited extent, within the housing and providing additional means for immobilizing the collar within the housing when so desired.

Thus, the rear end of the rear housing section 16 may be provided with a cut out portion 194 on its upper surface into which may extend a rib 196 formed on the collar, so that the edges of the cut out 194 may limit the movement of the collar within the housing, such opening being wide enough to permit sufficient movement of the collar to permit rotation of the plug sufficiently to slide the lock bolt that may be engaged by it out of locking position.

Means are provided to keep the collar normally in position to maintain the lock bolt in locking position by providing upon the rib 196 a rearwardly extending ear 198 which is provided with an eyelet 200 which is engaged by one end of a contracting coil spring 202, the other end of which is anchored on an ear 204 formed at the end of a tongue or arm 206 extending sideways from the lock plate 210. The spring 202 will tend to keep the collar and the plug engaged by it in the proper position for locking and will give the required resistance to turning to make operation of the lock comfortable.

To lock the collar against movement within the cylinder thus making the use of a key necessary to open it, there is provided hand operated means, adjustable from the interior of the locked compartment, adapted to be interposed between the rib 196 and the free edge of the cut out 194. This means may comprise a link 212 pivoted at one end on a pin 214 supported between two upstanding posts 216 formed on the housing exterior, one to each side of the cut out 194. The link 212 may be bifurcated at its free end, and one bifurcated arm, 218, provided with a depending lug 220 adapted to be lowered into the cut out 194 intermediate the rib 196 and the edge of the cut out, and the other arm 222 may have a linked arm 224 pivoted thereon whereby the link may be raised or lowered to block the movement of the collar. The linked arm may be provided with any suitable means for fixing it in either of its adjusted positions for raising or lowering the link 212.

While the embodiments described show specific structures, these structures all are designed as one kind of means of accomplishing the principles of the present invention which are also fully set forth and explained. I wish, therefore, to be protected for any variations in the specific embodiments described which may be made to accomplish the principles and theories of the present invention that may be made and conceived without the use and application of the inventive faculties and that may be within the spirit and scope of this invention and of the claims hereto appended.

I claim:

1. In a lock, a casing, a plug rotatably disposed within the said casing, said plug having a lock bolt operating end projecting from the casing, a plurality of longitudinal channels formed on its surface intermediate its ends and a longitudinal passage leading from each of said channels through the front portion of the plug to the exterior thereof, a plurality of teeth annularly arranged upon the interior of said casing in two spaced rows forming grooves corresponding to the said channels, a plurality of blocks slidably arranged upon the said plug one within each of said channels, one or more of said blocks being normally in engagement with the forward row of said teeth and adapted to be slid out of engagement therewith and one or more blocks normally disposed within the space between the said rows of teeth, an arm extending from each of said blocks through one of said passages to the exterior of the plug and extending therefrom, all of said arms terminating in one plane, whereby one or more of the said blocks may be simultaneously and uniformly moved within the said channels relative to the said teeth.

2. In a lock, a casing, a plug rotatably disposed within the said casing, said plug having a plurality of longitudinal channels formed on its surface intermediate its ends and a longitudinal passage leading from each of said channels through the front portion of the plug to the exterior thereof, a plurality of uniform teeth annularly arranged in two spaced rows surrounding the channeled portion of the plug on the interior of said casing, forming grooves corresponding to the said channels, a plurality of blocks, each equal in length to the length of said teeth, slidably arranged one within each of said channels, one group of said blocks being normally in engagement with the forward row of said teeth and adapted to be disengaged therefrom and another group of said blocks being normally disposed intermediate said rows of teeth and adapted to be arranged to engage the other of said rows of teeth, an arm extending from each of said blocks through a passage to the exterior of the plug, all of said arms terminating in substantially one plane, whereby a selected number of said blocks may be uniformly and simultaneously moved within the said channels relatively to the said teeth.

3. In a lock, a casing, a plug rotatably disposed within the said casing, means for locking the said plug against rotation slidably arranged over the central portion of the plug and means for manipulating said plug locking means passing through the front part of the said plug and exteriorly thereof whereby said locking means may be urged in and out of locking position, a plug actuating member slidably fitted about the forward end of the said plug and engaged thereon against axial rotation and adapted to operate the said manipulating means upon movement thereof over the plug.

4. In a lock, a casing, a plug, means at one end of the plug for rotating the same within the casing, said plug having a longitudinal guiding channel intermediate its ends and a passage leading from said channel through the said plug to a point adjacent its rotating means, a collar movably arranged within the said casing surrounding the said channelled portion of the said plug, a slidable member arranged in the said channel and extending through the said passage to the exterior of the plug wherefrom it may be moved along the said channel, means on the interior of the said collar to normally engage the said slidable member to prevent rotation of the plug within the said collar and means for limiting the movement of the said collar within the casing to thereby limit the rotation of the said plug within the said casing.

5. In a lock, a casing, a plug arranged within the said casing and rotatable therein, a collar within the said casing and surrounding a portion of the said plug therein, externally operable means for locking the said collar against and releasing the said collar for movement within the casing and means for locking the said plug against rotation within said collar.

6. In a lock, a casing, a plug rotatably disposed within the said casing, said plug having its rear end extending outwardly of the casing and means at its forward end whereby the plug may be engaged for rotation within the casing, a collar rotatably mounted within the casing and surrounding an intermediate portion of the said plug externally operable, means for locking the collar against movement in the casing and means operable from the front end of the plug for locking the plug to the collar to prevent rotation of the plug within the collar.

7. The lock of claim 5 wherein the means for locking the collar to the casing comprises a projection on the collar, the casing being provided with an opening into which the said projection extends, the walls of the said opening limiting the extent of movement of said projection, a link pivoted astride the said opening having a portion thereof adapted to fit within the said opening intermediate the said projection and an edge of the said opening whereby the movement of the projection within the opening is prevented.

8. The lock of claim 3, wherein the plug actuating member consists of a hollow tubular member having a closed end and having a circumferential slot adjacent its closed end adapted to admit a key adjacent the said manipulating means and to press the said key against the projecting ends of the said manipulating means upon movement of the member over the plug.

9. The lock of claim 2 having plug actuating means adapted to operate, in association with a key, to move the said blocks in and out of engagement with the said rows of teeth.

10. The lock of claim 2 having a plug actuating member slidably keyed on the plug and adapted to receive a key and to move said key against the ends of the said arms.

11. The lock of claim 2 having key receiving means slidably held on the plug and adapted to guide a key inserted therein against the ends of the said arms upon movement of the said means over the plug.

12. The lock of claim 2 having a hollow tubular member, closed at one end, slidably keyed over the forward end of the plug, said member having a circumferentially disposed slot adjacent its closed end adapted to receive and guide a key inserted therein against the ends of the said arms.

13. The lock of claim 2 having a hollow tubular member, closed at one end, slidably keyed over the forward end of the plug, and resilient means for normally retaining the closed end of the member spaced from the forward end of the plug, said member having a circumferentially disposed key slot adjacent its closed end adapted to guide a key inserted therein against the ends of the said arms.

14. In a lock having a plug and a casing, members slidable axially on the plug for locking the plug in the casing, said members projecting beyond one end of the plug and having their terminals in one plane externally of the plug, whereby the said locking members may be selectively moved by a selective key pressed against their projecting ends.

15. In a lock having a plug and a casing, members slidable axially on the plug for locking the plug in the casing, said members projecting beyond one end of the plug and having their terminals in one plane externally of the plug, whereby the said locking members may be selectively moved by a selective key pressed against their projecting ends and means for moving and guiding a key against the projecting ends of the said locking members.

16. The lock of claim 15, wherein the means for guiding and moving a key include a cup member arranged over the end of the plug to be axially slidable thereon and a slot in the said cup adapted to admit a key and to move said key towards the ends of the locking members, upon movement of the said cup member.

JACOB M. MARATECK.